United States Patent
Katoh et al.

(10) Patent No.: US 8,494,265 B2
(45) Date of Patent: Jul. 23, 2013

(54) IMAGE CORRECTION METHOD, IMAGE CORRECTION DEVICE, AND PROGRAM

(75) Inventors: Satoshi Katoh, Tokyo (JP); Akira Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 624 days.

(21) Appl. No.: 12/739,777

(22) PCT Filed: Oct. 17, 2008

(86) PCT No.: PCT/JP2008/068888
§ 371 (c)(1),
(2), (4) Date: Apr. 26, 2010

(87) PCT Pub. No.: WO2009/054326
PCT Pub. Date: Apr. 30, 2009

(65) Prior Publication Data
US 2010/0260419 A1     Oct. 14, 2010

(30) Foreign Application Priority Data

Oct. 26, 2007   (JP) .................... 2007-278992

(51) Int. Cl.
*G06T 5/00*          (2006.01)
(52) U.S. Cl.
USPC ........... 382/167; 382/170; 382/190; 382/224; 382/274
(58) Field of Classification Search
None
See application file for complete search history.

(56) References Cited

U.S. PATENT DOCUMENTS

| 5,940,530 A * | 8/1999 | Fukushima et al. ......... 382/164 |
| 2007/0292038 A1* | 12/2007 | Takemoto .................. 382/240 |
| 2009/0116043 A1* | 5/2009 | Nakajima et al. ............. 358/1.9 |

FOREIGN PATENT DOCUMENTS

| JP | 8-32838 A | 2/1996 |
| JP | 11-205583 A | 7/1999 |
| JP | 11-283025 A | 10/1999 |
| JP | 2000182043 A | 6/2000 |
| JP | 2006319714 A | 11/2006 |
| WO | 2006036027 A | 4/2006 |

OTHER PUBLICATIONS

European search report for EP08841457 dated Sep. 10, 2009.
International Search Report for PCT/JP2008/068888 mailed Nov. 18, 2008.
A. Inoue et al, "Adaptive Quality Improvement Method for Color Images", Proc. of SPIE—The International Society for Optical Engineering, vol. 2179, Feb. 1994, pp. 429-439.

* cited by examiner

Primary Examiner — Brian P Werner

(57) ABSTRACT

An image correction device includes a scene belonging rate computation unit that computes, from the feature value of an input image, a plurality of scene belonging rates each of which prescribes a probability with which the input image belongs to each category scene; an unknown scene belonging rate specification unit that specifies an unknown scene belonging rate prescribing a probability with which the input image belongs to an unknown scene; a by-scene correction parameter memory unit that stores by-scene correction parameters; a correction parameter combination unit that computes a combined correction parameter that is the weighted average of the correction parameters using the plurality of scene belonging rates and the unknown scene belonging rate; and an image correction unit that performs image correction processing for the input image using the combined correction parameter.

5 Claims, 3 Drawing Sheets

IMAGE CORRECTION METHOD, IMAGE CORRECTION DEVICE, AND PROGRAM

REFERENCE TO RELATED APPLICATION

This application is the National Phase of PCT/JP2008/068888, filed Oct. 17, 2008, which is based upon and claims the benefit of the priority of Japanese Patent Application No. 2007-278992 filed on Oct. 26, 2007, the disclosure of which is incorporated herein in its entirety by reference thereto.

TECHNICAL FIELD

The present invention relates to an image correction method, an image correction device, and a program for correcting the color and the gradation of an image for increasing the image quality.

BACKGROUND

In recent years, mobile phones having the digital camera function have been widely used, and this digital camera function is used in a variety of ways; for example, photographed images are viewed on the screen of a mobile phone, transferred to computer apparatuses such as a personal computer, or output as printed photographs. In this case, an image photographed by a digital camera is sometimes not suitable as a viewing image due to an improper exposure adjustment when the photograph was taken and, in such a case, the image correction device provided in the mobile phone, computer apparatus, or printer is used for image correction, such as color correction or gradation correction.

The amount of image correction for color correction or gradation correction must be set to the optimum value according to the image, and this optimum value depends on the content of an image or on the preference of a person who views the photograph. Therefore, the ideal correction of images requires the user to manually adjust the correction amounts of images, once for each image, meaning that the manual correction of a large number of images requires vast amounts of manpower. To solve this problem, a method for automatically controlling the image correction on a device is proposed. For example, Non-Patent Document 1 given below proposes an automatic image correction method based on histogram analysis.

However, the image correction method described above, which cannot recognize objects, such as a portrait (photograph of a person), landscape, flower, and night scene, and classify them into respective categories, sometimes corrects images too much depending upon the scene. For example, the color saturation of a portrait is enhanced too much to make the skin color appear redder than it should be. To solve this problem, a method is proposed recently to dynamically change the correction amount of an image by recognizing the scene. For example, Patent Documents 1 and 2 given below disclose a method for recognizing the face area in an image, computing the correction amount suitable for the portrait based on the color distribution analysis of the part, and correcting the image according to the computed correction amount.

In the method described above, though the scene recognition processing is performed usually by computing the feature value of the edges and colors of an input image and, after that, performing the pattern recognition processing based on the computed feature value, the erroneous recognition probability of the pattern recognition processing is not zero. However, because the image correction method described in Patent Documents 1 and 2 do not take into consideration a scene recognition error, there occurs a problem that a scene recognition error, if generated, would lead to a correction amount error and, as a result, image quality degradation.

In addition, the object included in a photographed image is not always one object but, in many cases, a mixture of two or more objects. For example, the image includes persons and grass, persons and flowers, or persons and night scenes. When multiple objects are mixed, correction made to one object may adversely affect the image of other objects.

To solve the problem with a mixture of multiple objects, Patent Document 3 given below discloses a method for creating multiple correction images, one for each of multiple photographed objects, and combining the multiple corrected images according to the positions of the objects. The problem with this method is that the creation of multiple correction images requires a large amount of working memory and therefore increases the processing cost. In addition, because the erroneous recognition of an object is not taken into consideration, an erroneous recognition, if generated, would lead to image quality degradation in the same way as in the methods described above.

Patent Document 1:
Japanese Patent Kokai Publication No. JP-A-11-283025
Patent Document 2:
Japanese Patent Kokai Publication No. JP-P2000-182043A
Patent Document 3:
Japanese Patent Kokai Publication No. JP-A-11-205583
Non-Patent Document 1:
A. Inoue and J. Tajima, "Adaptive Quality Improvement Method for Color Images," Proc. of SPIE, Vol. 2179, pp. 429-439, 1994.

SUMMARY

The disclosure of Patent Documents 1-3 and Non-Patent Document 1 given above is hereby incorporated in its entirety by reference into this specification. The following analysis is given by the present invention.

As described above, the image correction methods described above have the following problems.

A first problem is that an image in which multiple objects are mixed cannot be corrected properly. The reason is that, if correction appropriate for one of the objects is performed, the image quality of the other objects is sometimes degraded.

A second problem is that the method for recognizing the positions of multiple objects, creating correction images, one for each object, and combining the images according to the positions of those objects, if employed, would result in an increase in the processing cost. The reason is that the method requires a working memory in which the correction images corresponding to the objects must be stored.

A third problem is that erroneous recognition, which might be generated during the scene recognition processing, would lead to image quality degradation. The reason is that the method does not assume that erroneous recognition will occur.

In view of the problems given above, there is a need in the art to provide an image correction method, an image correction device, and a program for properly correcting an image that includes multiple objects without increasing the processing cost.

An image correction method in a first aspect of the present invention includes: computing, from a feature value of an input image, a plurality of scene belonging rates each of which prescribes a probability with which the input image belongs to each category scene; computing a combined correction parameter that is a weighted average of by-scene correction parameters using the plurality of scene belonging rates and an unknown scene belonging rate that prescribes a probability with which the input image belongs to an unknown scene; and performing image correction processing for the input image using the combined correction parameter.

An image correction device in a second aspect of the present invention includes:

a scene belonging rate computation unit that computes, from a feature value of an input image, a plurality of scene belonging rates each of which prescribes a probability with which the input image belongs to each category scene;

an unknown scene belonging rate specification unit that specifies an unknown scene belonging rate prescribing a probability with which the input image belongs to an unknown scene;

a by-scene correction parameter memory unit that stores by-scene correction parameters;

a correction parameter combination unit that computes a combined correction parameter that is a weighted average of the correction parameter using the plurality of scene belonging rates and the unknown scene belonging rate; and an image correction unit that performs image correction processing for the input image using the combined correction parameter.

A program in a third aspect of the present invention causes a computer to function as:

a scene belonging rate computation unit that computes, from a feature value of an input image, a plurality of scene belonging rates each of which prescribes a probability with which the input image belongs to each category scene; and a correction parameter combination unit that computes a combined correction parameter that is a weighted average of by-scene correction parameters using the plurality of scene belonging rates and an unknown scene belonging rate that prescribes a probability with which the input image belongs to an unknown scene.

In the image correction method in a first mode, it is preferable that the computing a combined correction parameter includes computing the combined correction parameter by further using a by-scene erroneous classification weight value.

In the image correction method in a second mode, it is preferable that the correction parameter is an amount of color saturation enhancement.

In the image correction method in a third mode, it is preferable that the weight value takes a larger value as erroneous recognition has a greater effect on an image quality.

In the image correction device in a fourth mode, it is preferable that the correction device further includes a by-scene erroneous classification weight memory unit that stores a by-scene erroneous classification weight value, wherein the correction parameter combination unit computes the combined correction parameter by further using the weight value.

In the program in a fifth mode, it is preferable that the program further causes the computer to function in such a way that the correction parameter combination unit computes the combined correction parameter by further using a by-scene erroneous classification weight value.

The image correction method, image correction device, and program of the present invention provide the following advantages, but not restricted thereto.

A first effect of the present invention is that an image in which multiple objects are mixed may be appropriately corrected by providing multiple scene belonging rate computation units for controlling the correction parameter based on the scene belonging rates for multiple scene categories.

A second effect of the present invention is that the consumption of a work memory may be reduced and the processing cost may be lowered by combining not correction images but correction parameters according to the scene belonging rates.

A third effect of the present invention is that the effect of a classification error in a specific scene may be distributed by providing multiple scene belonging rate computation units for computing scene belonging rates for multiple scene categories.

A fourth effect of the present invention is that appropriate image correction may be performed without degradation even for an image, in which an object belonging to an unknown category is included, by providing an unknown scene belonging rate specification unit, in addition to the multiple scene belonging rate computation units, for controlling correction parameters considering the probability with which an input image does not belong to any category.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

Explanations of symbols are given in the following description.

PREFERRED MODES

In the image correction method described in the background art, an image including a mixture of multiple objects cannot be corrected properly. In the method in which the correction image is generated for each of multiple objects and the generated correction images are combined, the processing cost is increased. A still another problem is that the image quality is degraded if erroneous recognition is generated during the scene recognition processing.

To solve the problems described above, an image correction device of the present invention provides multiple scene belonging rate computation units, one for each of various scene categories, for properly correcting an image in which multiple objects are mixed. To reduce the processing cost, the image correction device provides a correction parameter combination unit that combines, not correction images, but correction parameters. In addition to the multiple scene belonging rate computation units described above, the image correction device further provides an unknown scene belonging rate specification unit to prevent the erroneous recognition of a scene. The following describes the image correction device of the present invention in detail with reference to the drawings.

Although the image correction device in the exemplary embodiments is included for operation in an apparatus that corrects images, such as a mobile phone, a digital camera, a computer apparatus, and a printer, the following describes only the image correction device that is the characteristic part of the present invention.

First Exemplary Embodiment

Figure 1:
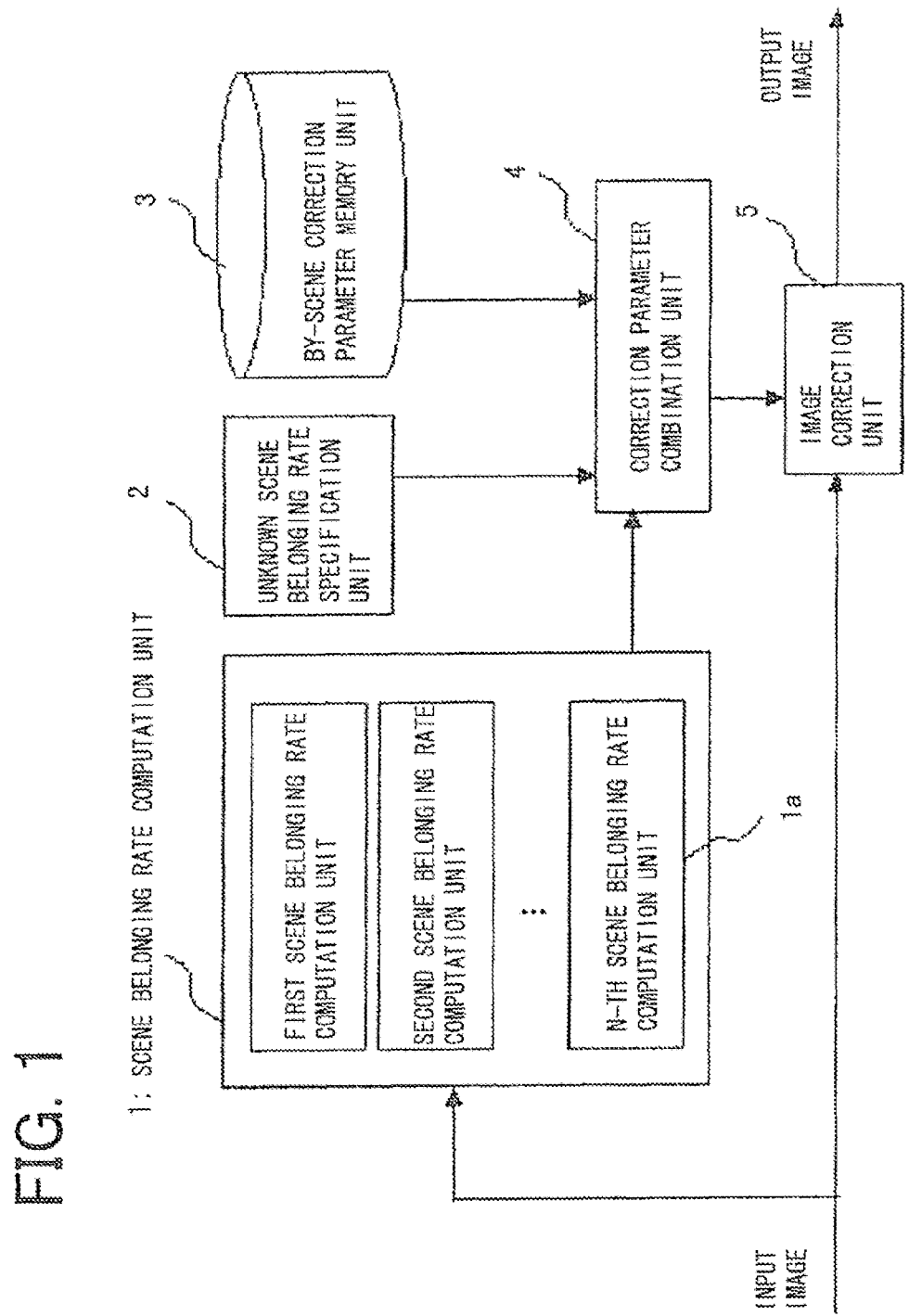
FIG. 1 is a block diagram showing the configuration of an image correction device in a first exemplary embodiment.
Figure 2:
FIG. 2 is a diagram showing an example of by-scene correction parameters.

First, an image correction method, an image correction device, and a program in a first exemplary embodiment of the present invention will be described below with reference to FIG. 1 and FIG. 2. FIG. 1 is a block diagram showing a configuration of the image correction device in this exemplary embodiment, and FIG. 2 is a table showing an example of by-scene correction parameters.

Referring to FIG. 1, the image correction device in this exemplary embodiment includes a scene belonging rate computation unit 1 that analyzes an input image and computes a value (called a scene belonging rate) prescribing the probability with which the input image belongs to the scene of each category, an unknown scene belonging rate specification unit 2 that specifies a value (called an unknown scene belonging rate) that prescribes the probability with which the input image belongs to an unknown scene, a by-scene correction parameter memory unit 3 in which the correction parameters for the scene categories are saved, a correction parameter combination unit 4 that combines by-scene correction parameters, and an image correction unit 5 that performs image correction based on the combined correction parameter. Note that the scene belonging rate computation unit 1 includes n scene belonging rate computation unit(s) 1a. The following describes those units in detail.

The scene belonging rate computation unit 1 computes scene belonging rates pc(c=1, 2, ... n) for multiple scene categories. An example of the scene belonging rate computation unit 1 is a scene classification method that uses a linear discriminant. The linear discriminant for classifying an input image into n categories is as shown in equation (1).

< Equation 1 >

$$y = \sum_{i=1}^{m} a_i \cdot x_i \quad (1)$$

In equation (1), xi is an m-dimensional feature value and y is defined as 1 when the input image belongs to an arbitrary scene category c and otherwise as −1. First, multiple teacher images are prepared and the value of y is manually given, and the optimum coefficient ai is computed by solving equation (1) using the least squares method. Next, the feature value xi is computed for the input image, and the coefficient ai and the feature value xi are applied to equation (1) to produce the value of y for the input image. It is determined that the input image belongs to the scene category c if the resulting value of y is close to 1 and does not belong to the scene category c if the resulting value of y is close to −1. This scene belonging rate may also be normalized such that the scene belonging rate is 1.0 when value of y is 1, and 0.0 when the value of y is −1. Equation (2) below is an example of a method for computing the scene belonging rate pc when the discriminant is yc (−1≦yc≦1).

<Equation 2>

$$p_c = (y_c + 1)/2 \quad (2)$$

By computing the coefficient ai for multiple scene categories c (c=1, 2, n), the scene belonging rates for multiple scene categories may be computed. In this way, the scene belonging rate computation unit 1 computes the scene belonging rates pc (c=1, 2, ... n) for n scene categories.

The unknown scene belonging rate specification unit 2 specifies the probability (unknown scene belonging rate) with which the input image does not belong to any supposed scene category. This unknown scene belonging rate, which is used for correcting the erroneous recognition of the scene belonging rate computation unit 1, may be specified manually by the user or may be specified as a fixed value in advance.

The by-scene correction parameter memory unit 3, which is a memory such as a ROM (Read Only Memory) or a RAM (Random Access Memory) or an HDD (Hard Disk Drive), saves optimum correction parameters for each scene category.

FIG. 2 is a diagram showing an example of data stored in the by-scene correction parameter memory unit 3. FIG. 2 shows an example in which the amount of color saturation enhancement k for five scene categories, 0-4, including the unknown scene, are stored as by-scene correction parameters 6. This amount of color saturation enhancement k is a parameter for emphasizing the color saturation corrected by equation (3).

< Equation 3 >

$$\begin{pmatrix} R' \\ G' \\ B' \end{pmatrix} = M^{-1} \cdot K \cdot M \begin{pmatrix} R \\ G \\ B \end{pmatrix} \quad (3)$$

$$K = \begin{pmatrix} 1 & 0 & 0 \\ 0 & 1+k/100 & 0 \\ 0 & 0 & 1+k/100 \end{pmatrix}$$

The matrix M, a transformation matrix for transforming the coordinate system to the YCbCr coordinate system, is represented by equation (4).

< Equation 4 >

$$M = \begin{pmatrix} 0.257 & 0.504 & 0.098 \\ -0.148 & -0.291 & 0.439 \\ 0.439 & -0.368 & -0.071 \end{pmatrix} \quad (4)$$

The correction parameter combination unit 4 combines the by-scene correction parameters 6 using the multiple scene belonging rates pc and the unknown scene belonging rate of the input image for computing the correction parameter appropriate for the input image. The scene belonging rate vector including the unknown scene is represented by equation (5). p0 is the unknown scene belonging rate specified by the unknown scene belonging rate specification unit 2, and p1-pn are scene belonging rates for n scene categories computed by the scene belonging rate computation unit 1.

<Equation 5>

$$p = \{p_0, p_1, p_2, p_3 \ldots p_n\} \quad (5)$$

Let kc be the correction parameter for the scene category c. Then, the new combined correction parameter k' is computed by equation (6). The resulting parameter is called a combined correction parameter.

<Equation 6>

$$k' = \frac{\sum_{c=0}^{x}(k_c \cdot p_c)}{\sum_{c=0}^{x} p_c} \qquad (6)$$

The image correction unit 5 performs the image correction processing using the combined correction parameter k' computed by the correction parameter combination unit 4. An example of the image correction unit 5 is an image processing unit for executing equation (3).

As described above, the image correction device of the present invention computes the combined correction parameter, which is the weighted average of the by-scene correction parameters, using the multiple scene belonging rates pc and the unknown scene belonging rate of an input image and, based on the combined correction parameter, performs the image correction processing. This allows the correction to be made properly for the image even if multiple objects are mixed. The image correction device does not consume extra working memory resources and therefore reduces the processing cost because the intermediate processing images need not be saved and, in addition, prevents erroneous recognition during the scene recognition processing.

The scene belonging rate computation unit 1 and the correction parameter combination unit 4 may be configured by hardware. It is also possible to configure the scene belonging rate computation unit 1 and the correction parameter combination unit 4 as a program that causes a computer to function as those units and to execute the program on control unit composed of the CPU (Central Processing Unit) and the memory.

The following describes this exemplary embodiment using an example.

Assume that an image is classified into three scene categories, A, B, and C. If the classification of the image as scene category A is correct, it is general that only the scene belonging rate for A is high and that the scene belonging rates for scene categories B and C are relatively low. In such a case, because the classification as scene category A is supposed to be correct, the correction parameter for scene category A should be used.

However, if the belonging rate for scene category A is high and, at the same time, the belonging rate for scene category B is high, it is less reliable that the input image belongs to scene category A. Such a result is obtained when both an object belonging to scene category A and an object belonging to scene category B are mixed. In this case, not only the correction amount for scene category A but also the correction amount for scene category B should be considered. In such a case, the image correction device in this exemplary embodiment uses the scene belonging rate of some other scene category to prevent emphasis from being placed on a single scene belonging rate.

In some cases, the scene belonging rates of all scene categories A, B, and C are intermediate or low. This frequently happens when an input image does not belong to any of scene categories A, B, and C. When such an image is received, it is desirable that the correction parameter of the unknown scene or a medium value of the correction parameters of scene categories A, B, and C be used. In such a case, the image correction device in this exemplary embodiment, which uses the scene belonging rate of the unknown scene, can make appropriate image correction with no degradation.

Second Exemplary Embodiment

Figure 3:
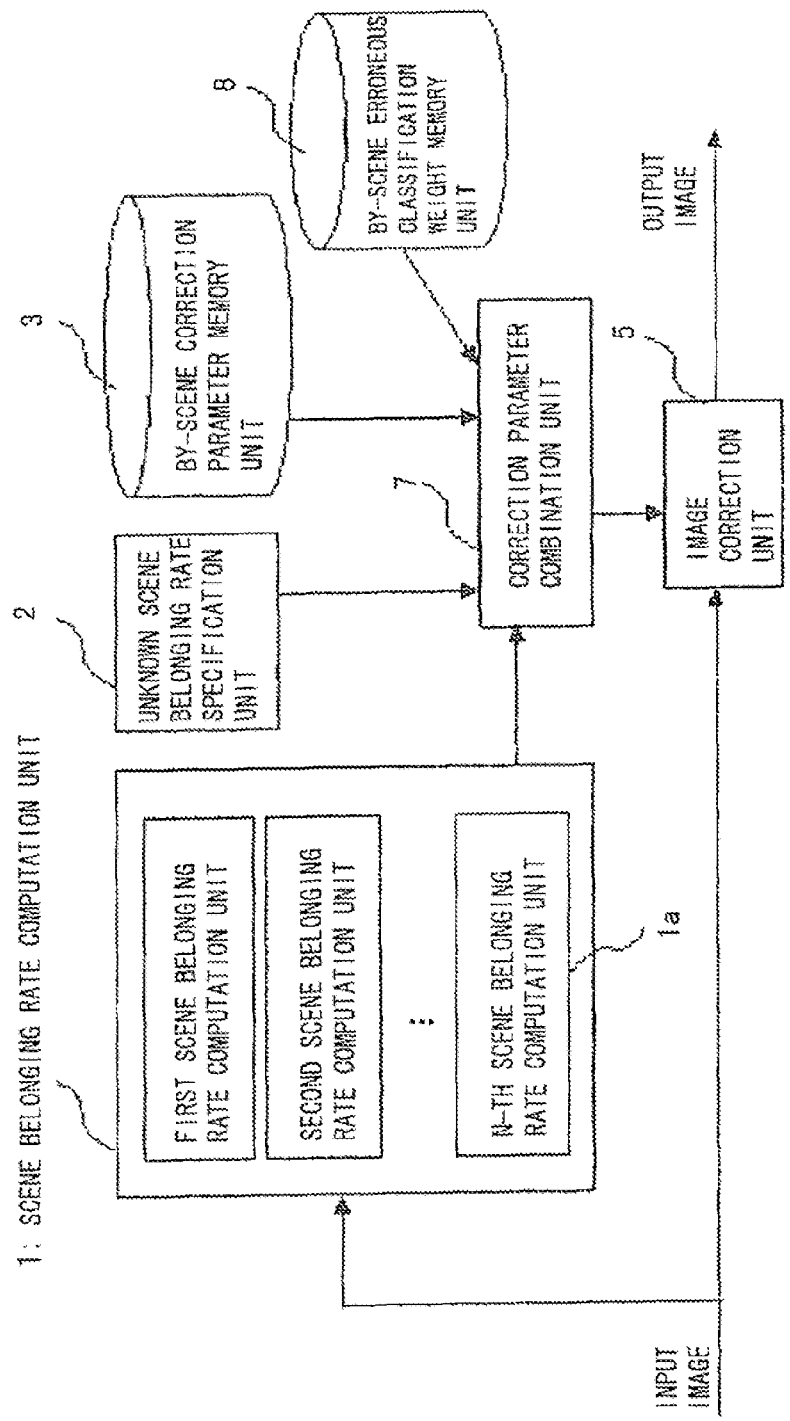
FIG. 3 is a block diagram showing the configuration of an image correction device in a second exemplary embodiment.

Next, an image correction method, an image correction device, and a program in a second exemplary embodiment of the present invention will be described below with reference to FIG. 3. FIG. 3 is a block diagram showing the configuration of the image correction device in this exemplary embodiment.

Although multiple scene belonging rates are dealt equally in the first exemplary embodiment described above, putting weight on scene belonging rates will decrease an adverse effect, caused by erroneous recognition, depending upon an input image. With this in mind, the image correction device in this exemplary embodiment includes, as shown in FIG. 3, a scene belonging rate computation unit 1 that analyzes an input image and computes multiple scene belonging rates, an unknown scene belonging rate specification unit 2 that specifies a probability value (unknown scene belonging rate) with which the input image belongs to an unknown scene, a by-scene correction parameter memory unit 3 in which by-scene correction parameters are saved, a by-scene erroneous classification weight memory unit 8 in which the weight values for by-scene erroneous classification (called by-scene erroneous classification weight) are saved, a correction parameter combination unit 7 that combines by-scene correction parameters, and an image correction unit 5 that performs image correction based on the combined correction parameter.

And, the correction parameter combination unit 8 computes the correction parameter appropriate for the input image based on the scene belonging rate pc of the input image for each scene category, unknown scene belonging rate, by-scene correction parameter, and by-scene erroneous classification weights.

More specifically, the scene belonging rate vector including the unknown scene is represented by equation (5) and the by-scene erroneous classification weight is represented by equation (7). In equation (7), w0 is the erroneous classification weight for the unknown scene. w1-wn are n by-scene erroneous classification weights.

<Equation 7>

$$w = \{w_0, w_1, w_2, w_3 \ldots w_n\} \qquad (7)$$

The combined correction parameter is computed using equation (8) where kc is the correction parameter for scene c and rc is the erroneous classification coefficient.

< Equation 8 >

$$k'' = \frac{\sum_{c=0}^{x}(k_c \cdot p_c \cdot r_c)}{\sum_{c=0}^{x} p_c} \qquad (8)$$

The erroneous classification coefficient rc is a coefficient reflecting the adverse effect that will be caused by erroneous recognition for each scene category. An example of the computation method for the erroneous classification coefficient rc is shown by equation (9).

<Equation 9>

$$r_c = 1 - w_c \cdot (1 - p_c) \qquad (9)$$

More specifically, assume, for example, that the setting is that the output image quality is significantly affected adversely if a landscape is mistaken for a night scene but is less affected if a night scene is mistaken for a landscape. In this case, because the erroneous classification as a night scene has a greater effect on the image quality, it is necessary to reduce the effect that will be caused by the erroneous recognition of the night scene classification. In such a case, the erroneous classification weight we for the night scene is increased so that, when the scene belonging rate is low, rc is decreased and the effect on the computation of the combined parameter is decreased.

As described above, with the by-scene erroneous classification weights saved in the image correction device, the by-scene correction parameters are combined using the scene belonging rates pc, the unknown scene belonging rate, and the by-scene erroneous classification weights. This decreases an adverse effect, which will be caused by the erroneous classification of a scene category, using the erroneous classification weight values.

It should be noted that the present invention is not limited to the description above but may be changed as necessary without departing from the spirit of the present invention.

INDUSTRIAL APPLICABILITY

The present invention is applicable to any apparatus that corrects a received image and outputs the corrected image, for example, a mobile phone with the camera function, a digital camera, a computer apparatus, and a printer.

The exemplary embodiments and the examples may be changed and adjusted in the scope of the entire disclosure (including claims) of the present invention and based on the basic technological concept. In the scope of the claims of the present invention, various disclosed elements may be combined and selected in a variety of ways. That is, the present invention of course includes the modifications and changes that may be made by those skilled in the art within the scope of the entire disclosure, including the claims, and the technological concept.

The invention claimed is:

1. An image correction method comprising:
   computing, from a feature value of an input image, a plurality of scene belonging rates each of which prescribes a probability with which the input image belongs to each category scene;
   computing a combined correction parameter that is a weighted average of by-scene correction parameters using the plurality of scene belonging rates and an unknown scene belonging rate that prescribes a probability with which the input image belongs to an unknown scene; and
   performing image correction processing for the input image using the combined correction parameter;
   wherein said computing a combined correction parameter computation includes computing the combined correction parameter by further using a by-scene erroneous class cation weight value.

2. The image correction method as defined by claim 1, wherein the correction parameter is an amount of color saturation enhancement.

3. The image correction method as defined by claim 1, wherein the weight value takes a larger value as erroneous recognition has a greater effect on an image quality.

4. An image correction device comprising:
   a scene belonging rate computation unit that computes, from a feature value of an input image, a plurality of scene belonging rates each of which prescribes a probability with which the input image belongs to each category scene;
   an unknown scene belonging rate specification unit that specifies an unknown scene belonging rate prescribing a probability with which the input image belongs to an unknown scene;
   a by-scene correction parameter memory unit that stores by-scene correction parameters;
   a correction parameter combination unit that computes a combined correction parameter that is a weighted average of the correction parameters using the plurality of scene belonging rates and the unknown scene belonging rate;
   an image correction unit that performs image correction processing for the input image using the combined correction parameter; and
   a by-scene erroneous classification weight memory that stores a by-scene erroneous classification weight value, wherein said correction parameter combination unit computes the combined correction parameter by further using the weight value.

5. A non-transitory computer-readable medium storing a program that causes a computer to function as:
   a scene belonging rate computation unit that computes, from a feature value of an input image, a plurality of scene belonging rates each of which prescribes a probability with which the input image belongs to each category scene; and
   a correction parameter combination unit that computes a combined correction parameter that is a weighted average of by-scene correction parameters using the plurality of scene belonging rates and an unknown scene belonging rate that prescribes a probability with which the input image belongs to an unknown scene;
   wherein said program further causes the computer to function in such away that said correction parameter combination unit computes the combined correction parameter by further using a by-scene erroneous classification weight value.

* * * * *